US007950635B2

(12) United States Patent
Proehl

(10) Patent No.: US 7,950,635 B2
(45) Date of Patent: May 31, 2011

(54) ADJUSTABLE HOLDING APPARATUS

(76) Inventor: Richard Proehl, Wyoming, MN (US)

( * ) Notice: Subject to any disclaimer, the term of this patent is extended or adjusted under 35 U.S.C. 154(b) by 459 days.

(21) Appl. No.: 12/206,595

(22) Filed: Sep. 8, 2008

(65) Prior Publication Data

US 2009/0064907 A1 Mar. 12, 2009

Related U.S. Application Data

(60) Provisional application No. 60/970,317, filed on Sep. 6, 2007.

(51) Int. Cl.
*B23Q 3/00* (2006.01)

(52) U.S. Cl. .............. 269/17; 269/71; 269/139; 269/51; 269/296; 248/676

(58) Field of Classification Search .................... 269/17, 269/16, 139, 51, 71, 76, 296, 285, 295; 248/676
See application file for complete search history.

(56) References Cited

U.S. PATENT DOCUMENTS

| | | | | |
|---|---|---|---|---|
| 1,833,355 | A * | 11/1931 | Dahms | 269/71 |
| 3,362,673 | A * | 1/1968 | Patch | 248/397 |
| 3,641,946 | A * | 2/1972 | Charnay | 108/6 |
| 4,943,040 | A * | 7/1990 | Finstad et al. | 269/69 |
| 5,707,450 | A * | 1/1998 | Thompson | 118/500 |
| 5,733,032 | A * | 3/1998 | Bolta et al. | 362/217.14 |
| 6,173,947 | B1 * | 1/2001 | Johnson | 269/17 |
| 6,484,378 | B1 * | 11/2002 | Arvin | 29/281.5 |
| 7,380,778 | B2 * | 6/2008 | Lawrence et al. | 269/139 |
| 7,448,606 | B1 * | 11/2008 | Johnson | 269/17 |
| 2009/0064907 | A1 * | 3/2009 | Proehl | 108/160 |
| 2009/0241805 | A1 * | 10/2009 | Hernandez | 108/6 |

* cited by examiner

*Primary Examiner* — Lee D Wilson

(74) *Attorney, Agent, or Firm* — Patwrite LLC; Mark David Torche

(57) ABSTRACT

An adjustable holding apparatus comprises a main frame section with at least two pneumatic wheels disposed at a bottom bifurcated portion therein, and another bifurcated portion having a pair of distally disposed stabilizing feet. A maneuvering portion is attached at right angles to an upper portion of the frame to aid in maneuvering the adjustable holding apparatus into position. A horizontal support arm and a vertical support arm distally attached from the handle portion to support a vertical adjustable arm and a horizontal adjustable arm. The support arms have adjustable sliding attachment ends that are positioned as needed. The horizontal and vertical support arms are moveably supported by a tilt adjustment plate that allows the arms to be positioned from 0 to 90 degrees. Clamping knobs provide adjustability.

20 Claims, 9 Drawing Sheets

ADJUSTABLE HOLDING APPARATUS

RELATED APPLICATIONS

This application claims priority and herein incorporates by reference U.S. provisional patent application 60/970,317, filed Sep. 6, 2007.

BACKGROUND OF THE INVENTION

As soon as humans began creating tools, they needed to hold and manipulate parts. While some animals like monkeys are adept at using all four of their limbs to hold things, humans generally are limited to holding things with their hands. Unfortunately this is not always sufficient to work on modern equipment such as automobiles, especially parts like doors or hoods. Body shops in particular have to remove and repair automobile parts as well as painting them to match the rest of the car.

Even when a mechanical aid is used, the part has to be worked on in many different orientations such as front and back or on a side, etc. Often this means that the part must be repositioned which involves additional handling lowering overall efficiency and increases the likelihood of damage or marring. There is a need for an adjustable parts holder that is easy to use and allows the user to adjust the spatial orientation of the held part to an infinite range of positions reducing handling and damage to the part.

SUMMARY OF THE INVENTION

An adjustable holding apparatus comprises a main frame section with at least two pneumatic wheels disposed at a bottom bifurcated portion therein, and another bifurcated portion having a pair of distally disposed stabilizing feet. A maneuvering portion is attached at right angles to an upper portion of the frame to aid in maneuvering the adjustable holding apparatus into position. A horizontal support arm and a vertical support arm distally attached from the handle portion to support a vertical adjustable arm and a horizontal adjustable arm. The support arms have adjustable sliding attachment ends that are positioned as needed. The horizontal and vertical support arms are moveably supported by a tilt adjustment plate that allows the arms to be positioned from 0 to 90 degrees. Clamping knobs provide adjustability.

Other features and advantages of the instant invention will become apparent from the following description of the invention which refers to the accompanying drawings.

DETAILED DESCRIPTION OF THE INVENTION

Figure 1:
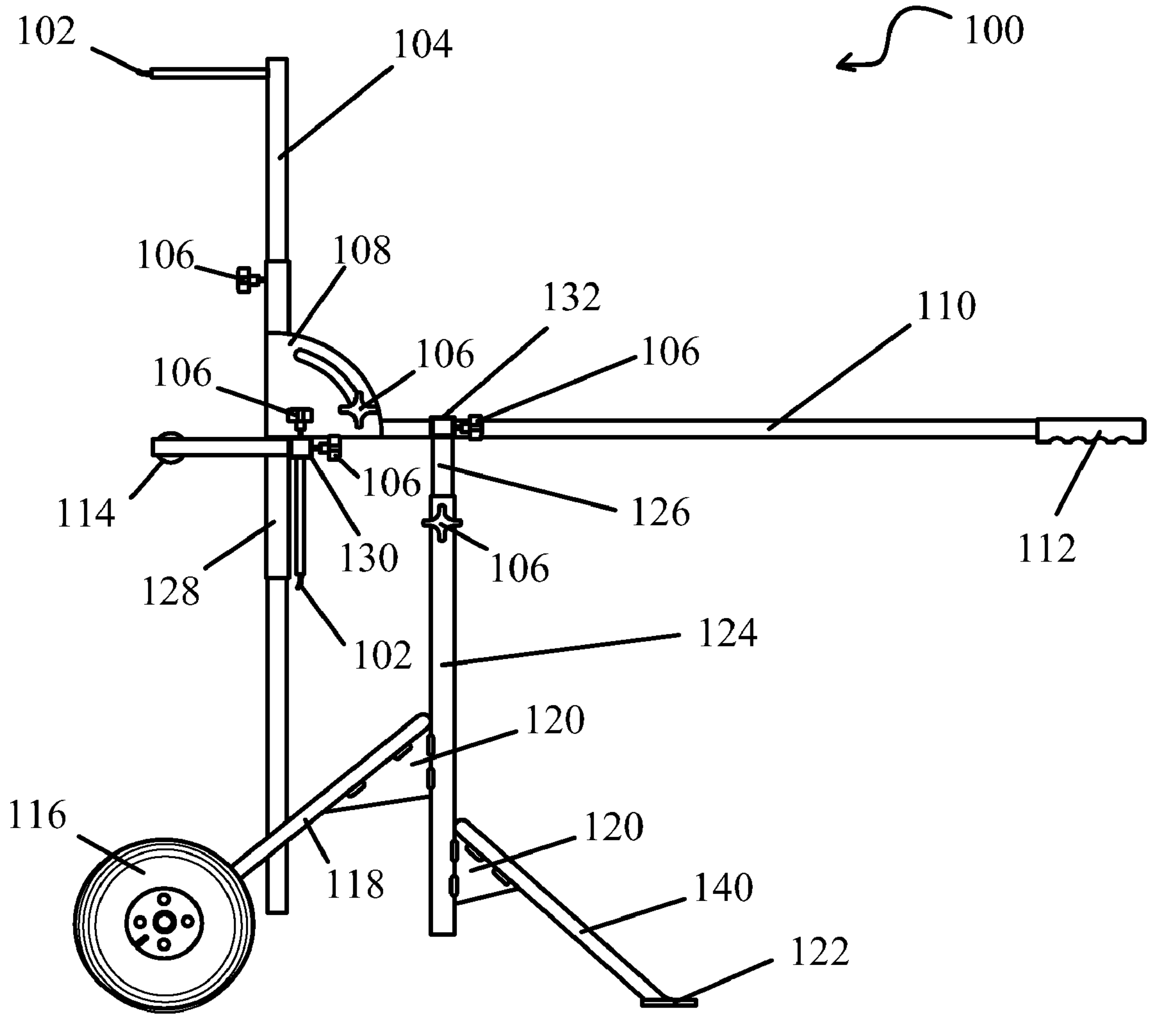
FIG. 1 is a side view of an adjustable holding apparatus according to an embodiment of the present invention.
Figure 2:
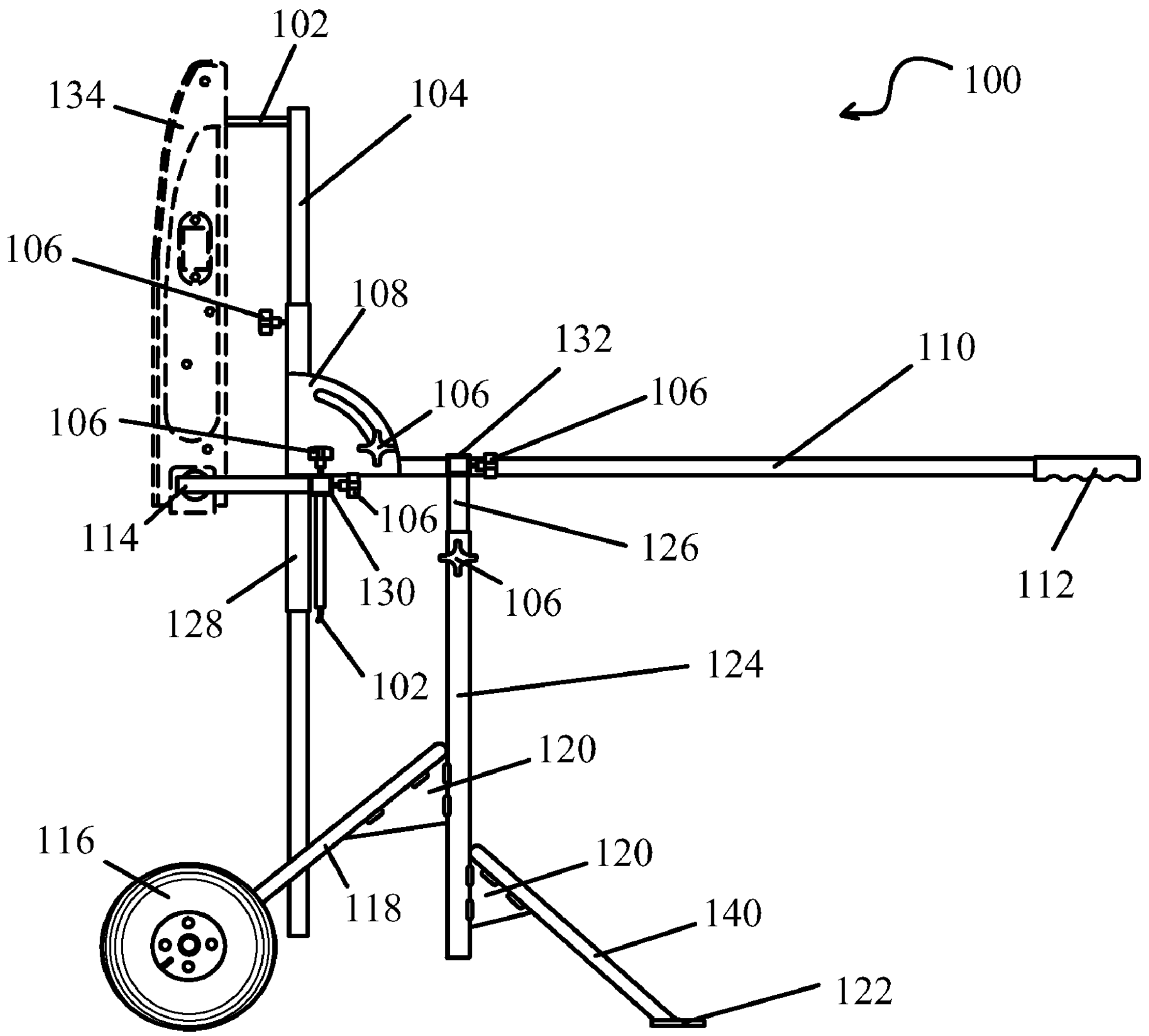
FIG. 2 is a side view of the adjustable holding apparatus holding an automotive part according to an embodiment of the present invention.
Figure 3:
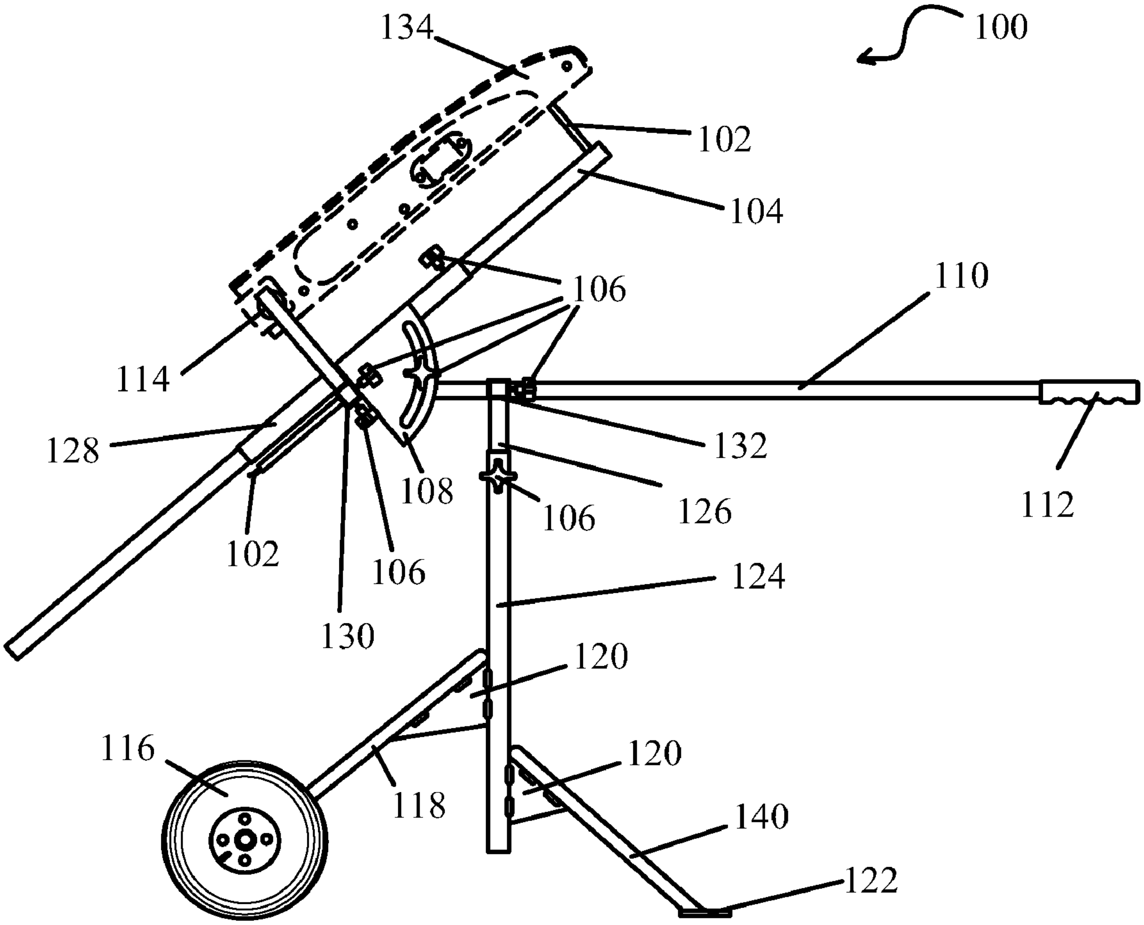
FIG. 3 is a side view of the adjustable holding apparatus according to an embodiment of the present invention.
Figure 4:
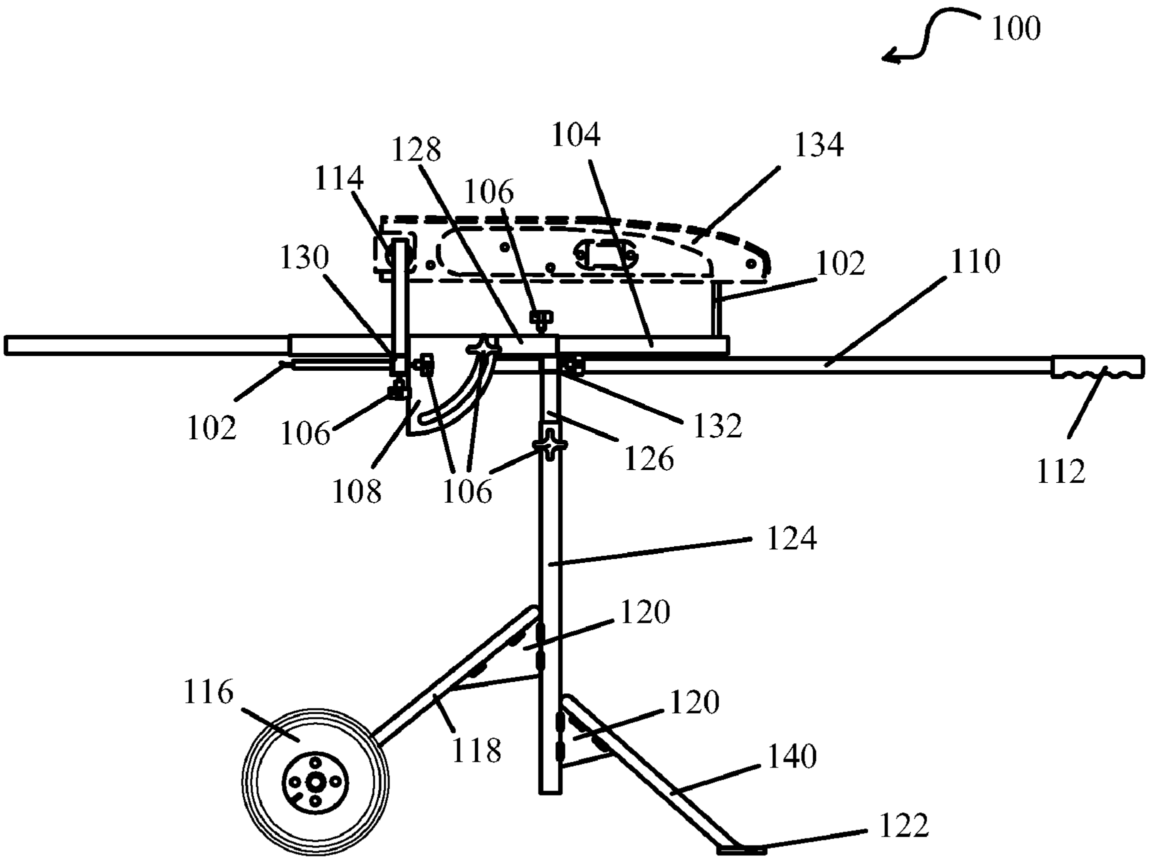
FIG. 4 is a side view of the adjustable holding apparatus according to an embodiment of the present invention.
Figure 5:
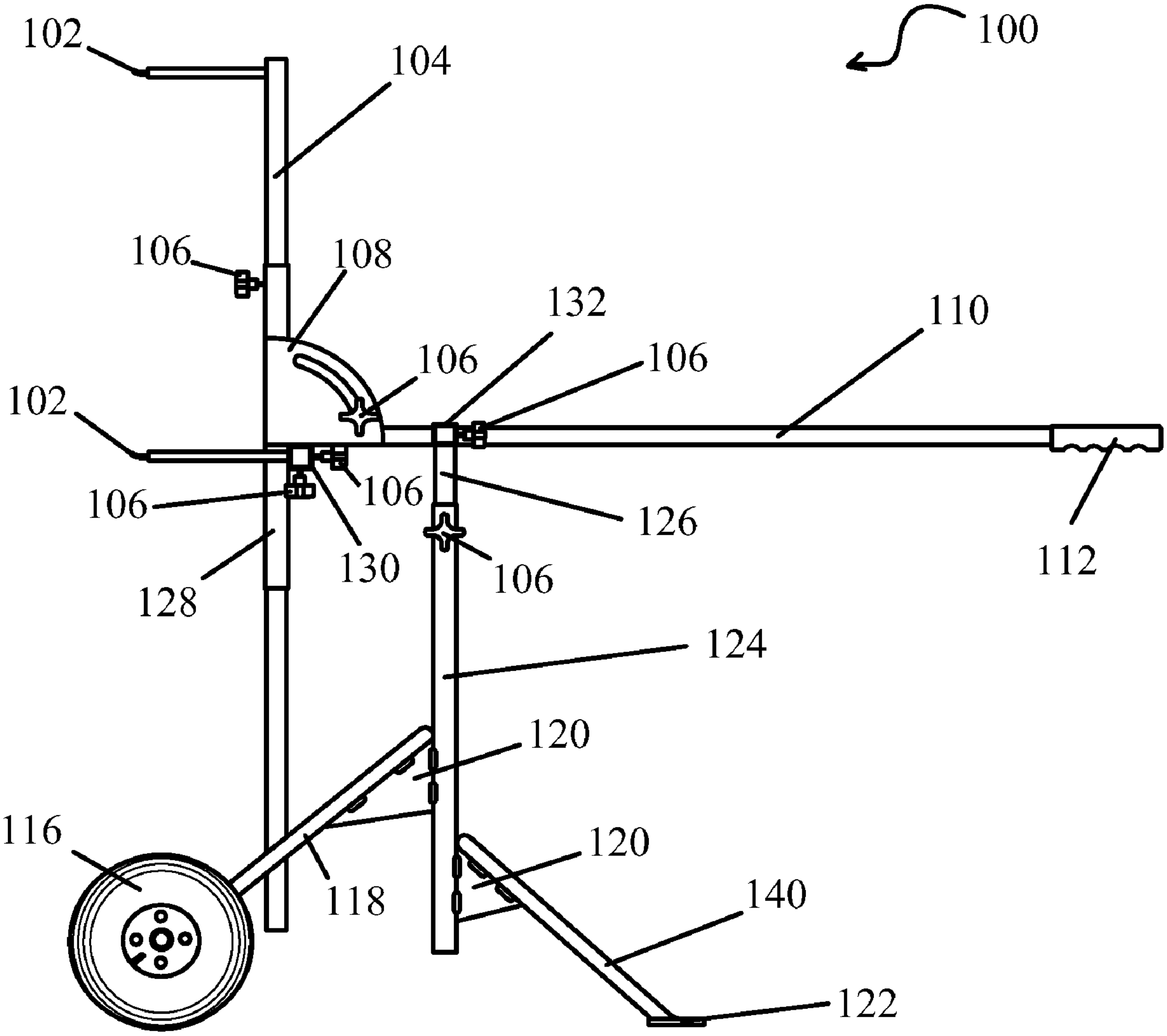
FIG. 5 is a side view of the adjustable holding apparatus according to an embodiment of the present invention.
Figure 6:
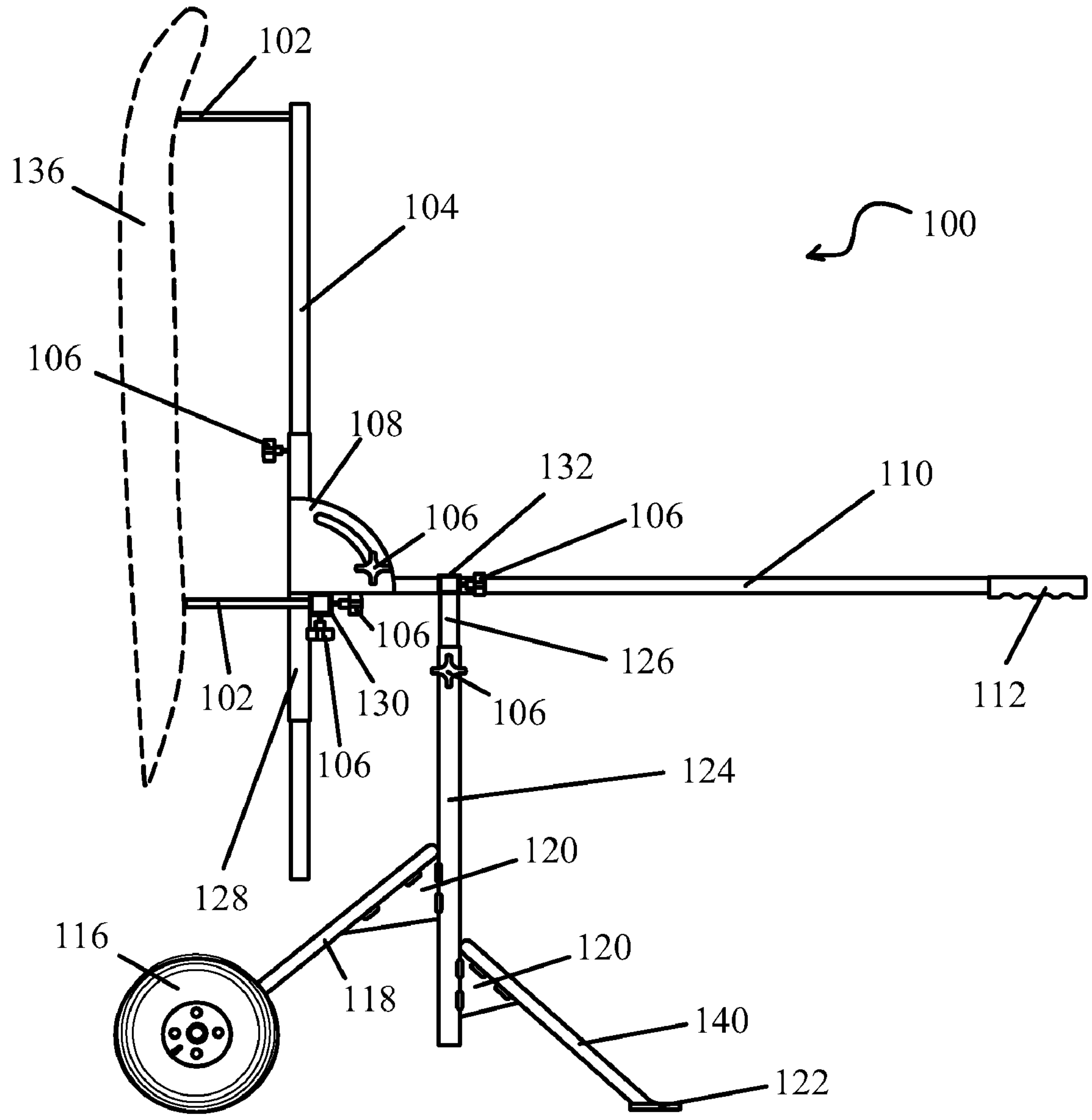
FIG. 6 is a side view of the adjustable holding apparatus holding an automotive part according to an embodiment of the present invention.
Figure 7:
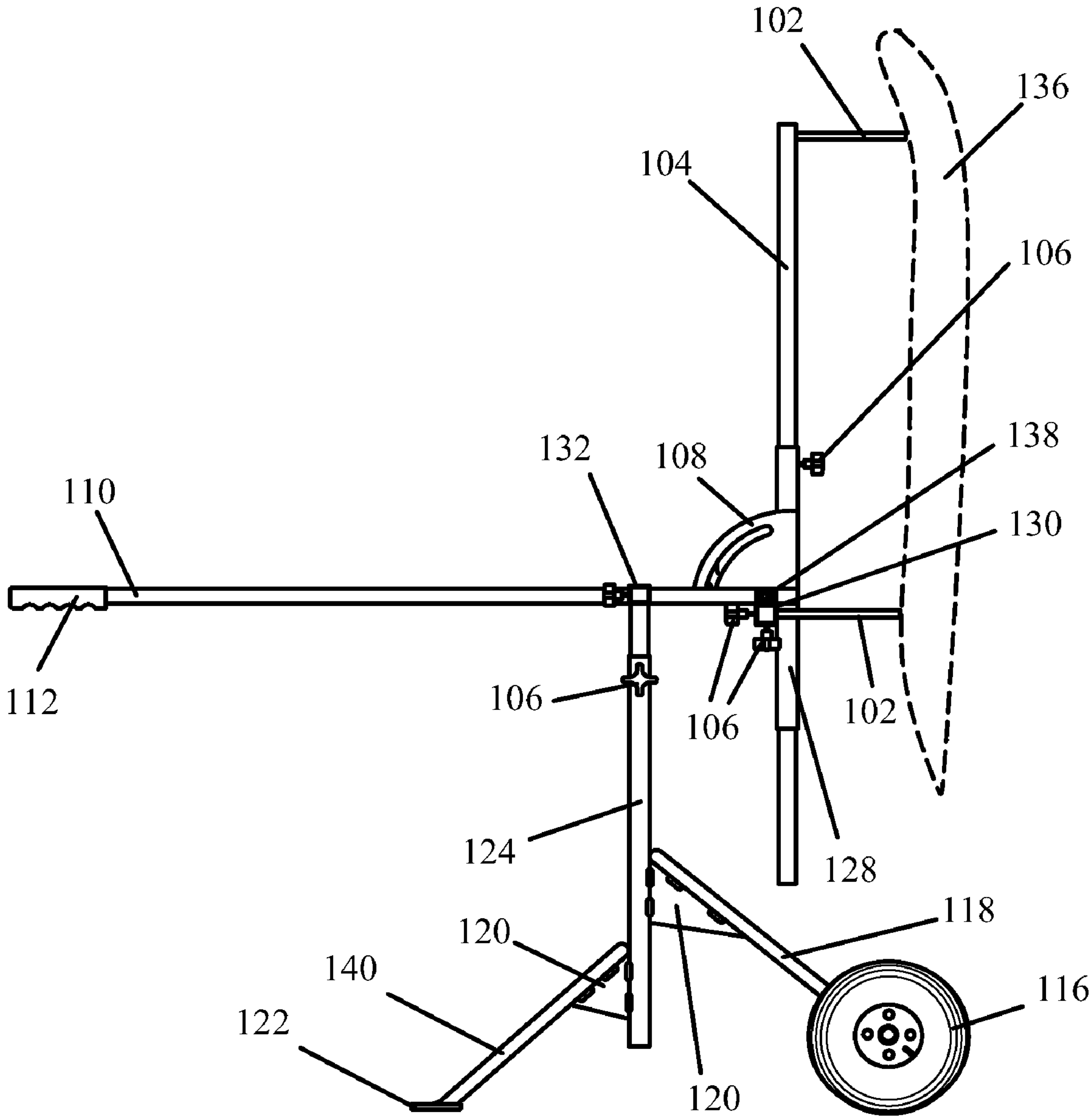
FIG. 7 is an opposite side view of the adjustable holding apparatus holding an automotive part according to an embodiment of the present invention.
Figure 8:
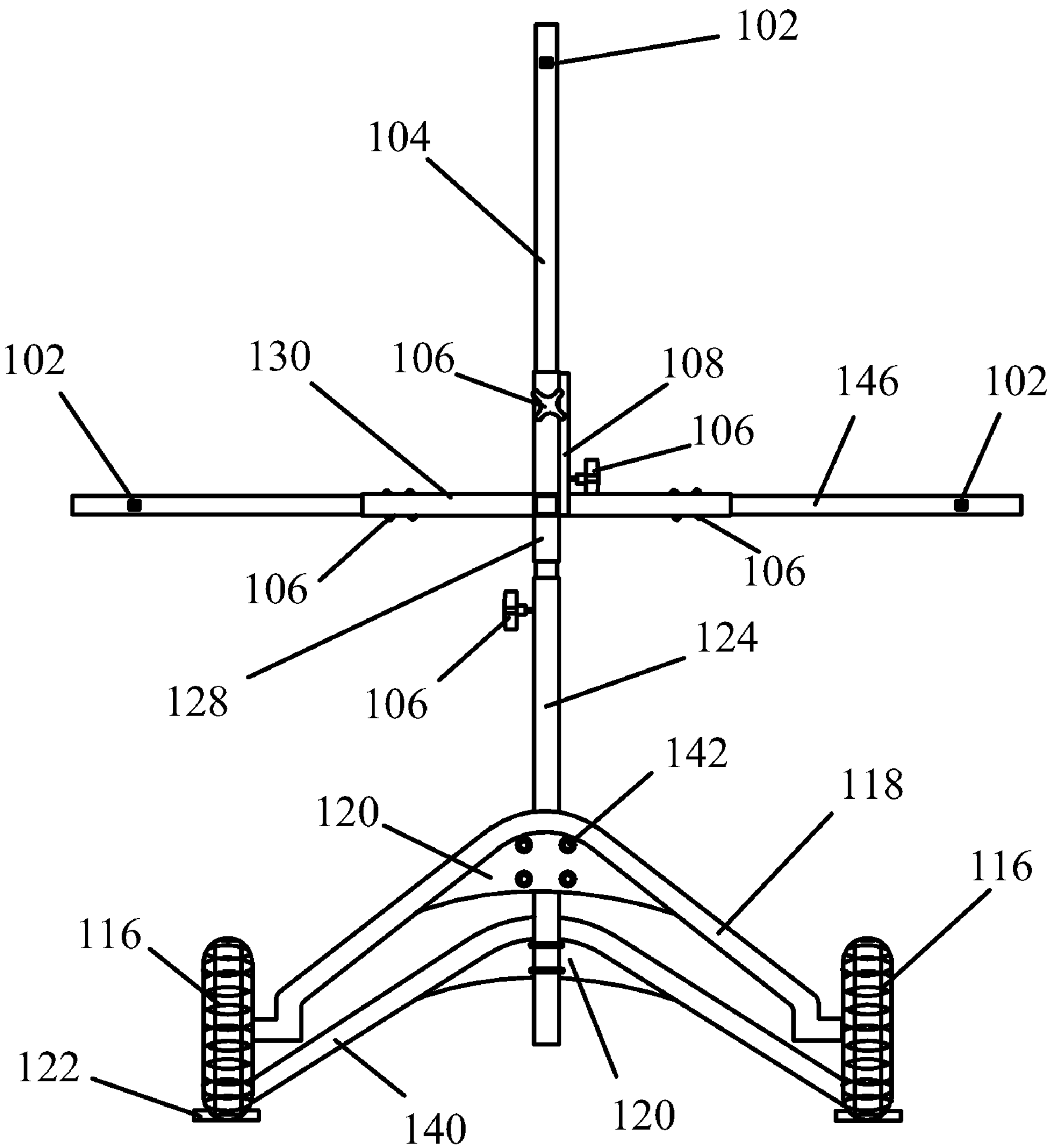
FIG. 8 is a front view of the adjustable holding apparatus according to an embodiment of the present invention.

In the following detailed description of the invention, reference is made to the drawings in which reference numerals refer to like elements, and which are intended to show by way of illustration specific embodiments in which the invention may be practiced. It is understood that other embodiments may be utilized and that structural changes may be made without departing from the scope and spirit of the invention.

Referring to FIGS. 1 through 4 and 8, an adjustable holding apparatus 100 has a main support arm 124 which moveably holds an adjustable main support arm 126 which is dimensioned to telescopically fit within main support arm 124 and is moveably held in place with a clamping knob 106. In operation, clamping knob 106 is loosened and adjustable main support arm 126 is raised and lowered as needed. Main support arm 124 has a bifurcated wheel leg 118 with an air filled pneumatic tire 116 at each end. A bifurcated stabilizing leg 140 is attached to main support arm 124 on an opposite side. A stabilizing pad 122 is distally disposed on each end of stabilizing leg 140. A control arm 110 is attached to an adjustable main support arm 126 which telescopically fits within main support arm 124 and is adjustably fixed in position by clamping knob 106. Both stabilizing leg 140 and wheel leg 118 are given extra support through the use of stiffeners 120 which are welded in place. Of course other attachment means are possible such as U-bolts or bolts and plates as is known in the art.

Main support arm 124 has an attachment arm 132 to provide additional support for optional attachment arms (not shown) for specific applications requiring additional support. Control arm 110 is disposed 90 degrees from an upper portion of main adjustable support arm 124 and is used to maneuver and position holding stand 100. A hand grip 112 is provided to allow ergonomic control. A user maneuvers holding stand 100 by holding hand grip 112 and lifting upwards forcing holding stand to pivot about wheels 116 simultaneously lifting stabilizing legs 140 and pads 122 off the floor allowing the user to roll holding stand 100 to a desired location and orientation.

A vertical support arm 128 is pivotally attached to a tilt adjustment plate 108 and is adjustably secured with clamping knob 106. Tilt adjustment plate 108 is distally disposed from hand grip 112 on control arm 110 and provides adjustable support for vertical support arm 128 and a horizontal support arm 130. An adjustable vertical arm 104 is telescopically disposed within vertical support arm 128 and is adjustably secured by clamping knob 106. An adjustable horizontal arm 146 is telescopically disposed within horizontal support arm 130 and is adjustably secured by clamping knob 106.

A user selects an attachment end 102 or 114 depending on the type of item being secured by holding stand 100. An automobile part 134 is secured using attachment end 102 by inserting the tip of attachment end 102 in an opening (not shown) in automobile part 134. Additionally, a pair of attachment ends 114 are inserted in a side opening of automobile part 134 to provide secure support. The position of automobile part 134 is infinitely adjustable from vertical to horizontal. Different kinds of attachment ends 102 and 114, are used to interact and hold automobile part 134 depending on the selected part. Examples of attachment ends include clips, clamps, pins and fingers as is known in the art. Of course other kinds of attachment ends may be used to hold parts other than for automobiles.

Now referring to FIGS. 5 through 7 and 8, holding stand 100 is shown using three attachment ends 102 to secure an automobile part 136. In this configuration the tips of attachment ends 102 are inserted in openings (not shown) in automobile part 136. Automobile part 136 is secured by moving adjustable vertical arm 104 to place automobile part 136 under tension. Two attachment ends 102 are disposed on horizontal support arm 130 and one attachment end 102 disposed on vertical adjustment arm 104. Adjustability of attachment ends 102 is achieved by moving adjustable horizontal support arm 146 to the desired position and then clamped in place using clamping knobs 106. Attachment ends 102 is permanently attached to adjustable horizontal support arm 146 and adjustable vertical support arm 104. Also in this embodiment, different attachment ends 102/114 are used by changing out adjustable horizontal support arms 146 and/or adjustable vertical support arm 104. Although holding stand 100 is shown using square stock, it would be possible to utilize tubing for one or more support arms and/or adjustable arms.

Figure 9:
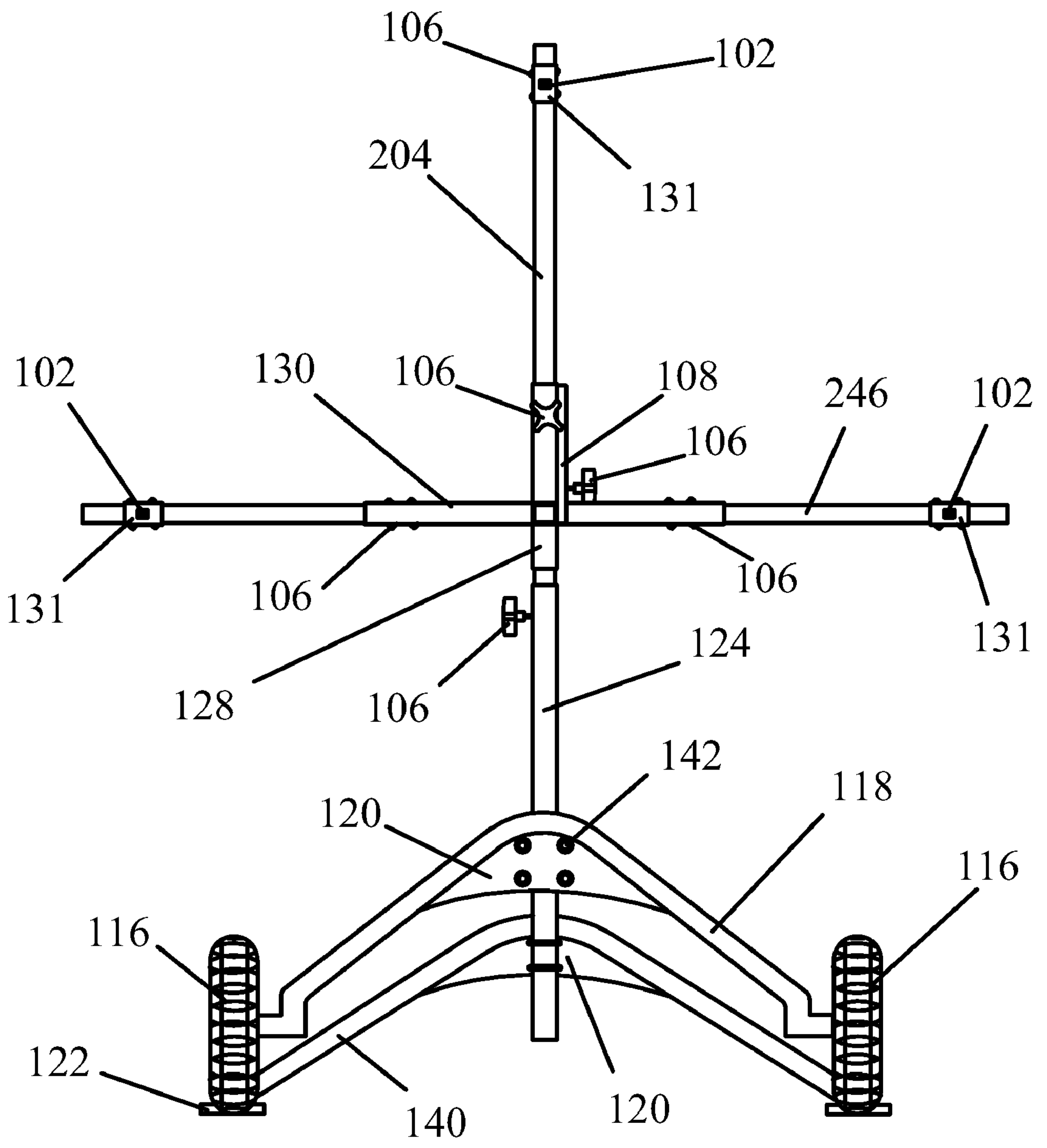
FIG. 9 is a front view of an adjustable holding apparatus according to another embodiment of the present invention.

Referring to FIG. 9, an adjustable vertical support 204 telescopically fits within vertical support arm 128 and adjustable horizontal support arm 246 telescopically fit within horizontal support arm 130 as discussed in the previous embodiment. A plurality of adjustable attachment sliders 131 fit over adjustable vertical support arm 246 and adjustable horizontal support arm 246 and are selectively held in place using clamping knobs 106. Each adjustable slider 131 has an attachment end attached therein. Again as discussed above, various attachment ends may be used depending on the specific application as is known in the art. This embodiment provides additional adjustability by allowing both adjustable horizontal and vertical support arms 246 and 204 to be adjusted as well as adjusting adjustable sliders 131 independently. This embodiment also facilitates changing attachment ends easily.

Although the instant invention has been described in relation to particular embodiments thereof, many other variations and modifications and other uses will become apparent to those skilled in the art.

What is claimed is:

1. An adjustable holding stand comprising:

a main support frame;

at least two wheels disposed at one end of said main support frame and arranged to provide support to said main support frame;

at least one stabilizing leg arranged to provide a stable support configuration in conjunction with said at least two wheels wherein said adjustable holding stand is stably supported therein;

a control arm generally orthogonally and distally disposed to said one end;

said control arm having a handle end and a support end;

a tilt adjustment plate moveably disposed on said support end wherein said tilt adjustment plate is adjustably rotatable to a selected angle;

a horizontal support arm generally orthogonally disposed on an opposite end of said main support frame and generally orthogonally disposed to said control arm; and a vertical support arm attached to said tilt adjustment plate wherein said vertical support rotates with said tilt adjustment plate.

2. An adjustable holding stand according to claim 1 further comprising an attachment means moveably disposed on at least one of said horizontal support arm or said vertical support arm wherein a part is held therein.

3. An adjustable holding stand according to claim 2 wherein said attachment means is at least one clip for holding said part.

4. An adjustable holding stand according to claim 2 wherein said attachment means is at least one clamp for holding said part.

5. An adjustable holding stand according to claim 2 wherein said attachment means is at least one pin for holding said part.

6. An adjustable holding stand according to claim 2 wherein said attachment means is at least one finger for holding said part.

7. An adjustable holding stand according to claim 2 further comprising:

an adjustable horizontal arm telescopically disposed within said horizontal support arm; and a holding means wherein said adjustable horizontal arm is retained at a selected position.

8. An adjustable holding stand according to claim 2 further comprising:

an adjustable vertical arm telescopically disposed within said vertical support arm; and a holding means wherein said adjustable vertical arm is retained at a selected position.

9. An adjustable holding stand according to claim 2 wherein said vertical support arm is selectably adjustable from 90 degrees to 0 degrees.

10. An adjustable holding stand according to claim 1 further comprising:

an adjustable main support arm telescopically disposed within said main support frame; and a holding means wherein said adjustable main support arm is retained at a selected position.

11. An adjustable holding stand according to claim 7 wherein said holding means is a clamping bolt with knob for frictionally engaging said adjustable horizontal arm.

12. An adjustable holding stand according to claim 8 wherein said holding means is a clamping bolt with knob for frictionally engaging said adjustable vertical arm.

13. An adjustable holding stand according to claim 10 wherein said holding means is a clamping bolt with knob for frictionally engaging said adjustable main support arm.

14. An adjustable holding stand according to claim 1 further comprising:

at least one adjustable attachment slider selectively disposed on said adjustable horizontal arm; and a holding means wherein said at least one adjustable attachment slider is retained at a selected position.

15. An adjustable holding stand according to claim 14 wherein said holding means is a clamping bolt with knob for frictionally engaging said adjustable horizontal arm.

16. An adjustable holding stand according to claim 15 further comprising an attachment means disposed on said at least one adjustment attachment slider.

17. An adjustable holding stand according to claim 16 wherein said attachment means is at least one clip for holding said part.

18. An adjustable holding stand according to claim 16 wherein said attachment means is at least one clamp for holding said part.

19. An adjustable holding stand according to claim 16 wherein said attachment means is at least one pin for holding said part.

20. An adjustable holding stand according to claim 16 wherein said attachment means is at least one finger for holding said part.

* * * * *